(12) United States Patent
Rao (10) Patent No.: US 8,443,031 B1
(45) Date of Patent: May 14, 2013

(54) SYSTOLIC ARRAY FOR CHOLESKY DECOMPOSITION

(75) Inventor: Raghavendar M. Rao, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 487 days.

(21) Appl. No.: 12/839,198

(22) Filed: Jul. 19, 2010

(51) Int. Cl.
G06F 7/32 (2006.01)

(52) U.S. Cl.
USPC .......................................................... 708/520

(58) Field of Classification Search
USPC .......................................................... 708/520
See application file for complete search history.

(56) References Cited

U.S. PATENT DOCUMENTS

| | | | |
|---|---|---|---|
| 4,727,503 A | 2/1988 | McWhirter | |
| 4,777,614 A | 10/1988 | Ward | |
| 4,823,299 A | 4/1989 | Chang et al. | |
| 5,018,065 A | 5/1991 | McWhirter et al. | |
| 5,323,335 A | 6/1994 | Mitchell | |
| 5,475,793 A | 12/1995 | Broomhead et al. | |
| 6,675,187 B1 | 1/2004 | Greenberger | |
| 7,069,372 B1 | 6/2006 | Leung et al. | |
| 7,120,658 B2 | 10/2006 | Nash | |
| 7,489,746 B1 | 2/2009 | Awater et al. | |
| 7,606,207 B2 | 10/2009 | Becker et al. | |
| 7,685,219 B2 | 3/2010 | Li | |
| 7,933,353 B2 | 4/2011 | Maltsev et al. | |
| 8,190,549 B2 | 5/2012 | Yang et al. | |
| 2003/0018675 A1 | 1/2003 | Asai et al. | |
| 2004/0071207 A1 | 4/2004 | Skidmore et al. | |
| 2008/0028015 A1 | 1/2008 | Seki | |
| 2009/0110120 A1 | 4/2009 | McNamara et al. | |
| 2009/0116588 A1 | 5/2009 | Mcnamara et al. | |
| 2009/0310656 A1 | 12/2009 | Maltsev et al. | |
| 2011/0125819 A1 | 5/2011 | Mazahreh et al. | |
| 2011/0264721 A1 | 10/2011 | Patel et al. | |

OTHER PUBLICATIONS

U.S. Appl. No. 12/814,319, filed Jun. 11, 2010, Rao et al.
U.S. Appl. No. 12/552,171, filed Sep. 1, 2009, Rao et al.
U.S. Appl. No. 12/552,174, filed Sep. 1, 2009, Raghavendar et al.
U.S. Appl. No. 12/552,178, filed Sep. 1, 2009, Raghavendar et al.
U.S. Appl. No. 12/552,180, filed Sep. 1, 2009, Raghavendar et al.
U.S. Appl. No. 12/623,624, filed Nov. 23, 2009, Tarn et al.
U.S. Appl. No. 12/623,656, filed Nov. 23, 2009, Mazahreh et al.
Bellis, S. J. et al., "Alternative systolic array for non-square-root Cholesky decomposition" *IEEE Proc.-Comput. Digit. Tech.*, Mar. 1997, pp. 57-64, vol. 144, No. 2, IEEE, Piscataway, New Jersey, USA.
Böhnke, Ronald et al., "Reduced Complexity MMSE Detection for BLAST Architectures" *Proc. of the 2003 IEEE Global Telecommunications Conference*, Dec. 1, 2003, pp. 2258-2262, vol. 4, IEEE, Piscataway, New Jersey, USA.

(Continued)

*Primary Examiner* — Tan V Mai
(74) *Attorney, Agent, or Firm* — LeRoy D. Maunu (57) ABSTRACT

A systolic array for Cholesky decomposition of an N×N matrix is described. A plurality of processing cells, including a corner cell, N−1 boundary cells, and $(N^2-3N+2)/2$ internal cells, are arranged into N−1 rows and N columns of processing cells. Each row of processing cells is configured to calculate elements of a respective column of a lower triangular output matrix. Each processing cell of each row is configured to determine a value of a respective element of the lower triangular output matrix using a value of an element calculated in a previous processing cell of the row.

20 Claims, 7 Drawing Sheets

OTHER PUBLICATIONS

Brent, Richard P., *Computing the Cholesky Factorization Using a Systolic Architecture*, Sep. 1982, pp. 1-15, TR 82-521, Cornell University, Department of Computer Science, Ithaca, New York, USA.

Edman, Fredrik *Digital Hardware Aspects of Multiantenna Algorithms*, PhD thesis, 2006, pp. 98, Lund University, Department of Electroscience, Lund, Sweden.

Edman, Fredrik et al., "A Scalable Pipelined Complex Valued Matrix Inversion Architecture" *Proc. of the 2005 IEEE International Symposium on Circuits and Systems*, May 23, 2005, pp. 4489-4492, vol. 5, IEEE, Piscataway, New Jersey, USA.

El-Amawy, A. et al., "Parallel VLSI algorithm for stable inversion of dense matrices," *IEE Proceedings-E Computer and Digital Techniques*, Nov. 1989, pp. 575-580, vol. 136, Issue 6, IEEE, Piscataway, New Jersey, USA.

Gentleman, W. M. et al., "Matrix triangularization by systolic arrays" *Proc. SPIE Symposium on Real-Time Signal Processing IV*, Aug. 1981, pp. 19-26, vol. 298, Society for Photo Optical Instrument Engineers, Bellingham, Washington, USA.

Haller, B. et al., "Efficient Implementation of Rotation Operations for High Performance QRD-RLS Filtering," *Proc. of the 1997 IEEE International Conference on Application-Specific Systems, Architectures and Processors*, Jul. 14, 1997, pp. 162-174, IEEE, Piscataway, New Jersey, USA.

Hassibi, Babak, "An Efficient Square-Root Algorithm for BLAST" *Proc. of the 2000 IEEE International Conference on Acoustics, Speech and Signal Processing*, Jun. 5, 2000, pp. 737-740, vol. 2, IEEE, Piscataway, New Jersey, USA.

Haykin, Simon, Adaptive Filter Theory 2002, pp. 838-841, Appendix F, Prentice Hall, Upper Saddle River, New Jersey, USA.

Hemkumar, Nariankadu, "Efficient Complex Matrix Transformations with CORDIC," *Proc. of the 1993 IEEE 11th Symposium on Computer Arithmetic*, Jun. 29, 1993, pp. 122-129, IEEE, Piscataway, New Jersey, USA.

Hemkumar, Nariankadu D., *A Systolic VLSI Architecture for Complex SVD*, MS Thesis, May 1991, pp. 1-122, Rice University, Department of Electrical and Computer Engineering, Houston, Texas.

Karkooti, Marjan et al., "FPGA Implementation of Matrix Inversion Using QRD-RLS Algorithm," *Conference Record of the 39th Asilomar Conference on Signals, Systems and Computers*, Oct. 28, 2005, pp. 1625-1629, IEEE, Piscataway, New Jersey, USA.

Kim, Hun Seok et al., "A Practical, Hardware Friendly MMSE Detector for MIMO-OFDM-Based Systems," *EURASIP Journal on Advances in Signal Processing*, 2008, pp. 1-14, vol. 2008, Hindawi Publishing Corp., New York, New York, USA.

Ma, Lei et al., "Modified Givens Rotations and Their Application to Matrix Inversion," *Proc. of the International Conference on Acoustics, Speech and Signal Processing (ICASSP 2008)* Mar. 31, 2008, pp. 1437-1440, IEEE, Piscataway, New Jersey, USA.

Porta, Tiba, *A Programmable Systolic Array for Factorial Data Analysis Part I: Matrix Computations*, Jun. 1987, pp. 1-17, Research Report YALEU/DCS/RR-542, Yale University, Department of Computer Science, New Haven, Connecticut, USA.

Salmela, Perttu et al., "DSP Implementation of Cholesky Decomposition," *Proc. of the 2006 Joint IST Workshop and Symposium on Trends in Communications (sympoTIC '06)* Jun. 27, 2006, pp. 6-9, IEEE, Piscataway, New Jersey, USA.

Sayed, Ali, *Fundamentals of Adaptive Filtering*, 2003, pp. 804-807, Section 12.A.1, John Wiley & Sons, Inc., Hoboken, New Jersey, USA.

Wyrzykowski, R. et al., "One-dimensional processor arrays for linear algebraic problems," *IEEE Proc.-Comput. Digit. Tech.*, Jan. 1995, pp. 1-4, vol. 142, No. 1, IEEE, Piscataway, New Jersey, USA.

Yang, Depeng et al., "An FPGA Implementation for Solving Least Square Problem," *Proc. of the 2009 17th IEEE Symposium on Field Programmable Custom Computing Machines*, Apr. 5, 2009, pp. 303-306, IEEE Computer Society, Washington, DC, USA.

Altera Corp., *QR Matrix Decomposition*, Application Note AN-506-2.0, Feb. 2008, pp. 1-55, Altera Corporation, San Jose, California, USA.

Boher, Laurent et al., "Analysis of CORDIC-based Triangularization for MIMO MMSE Filtering" *Proc. of the 2008 IEEE International Symposium on Circuits and Systems (ISCAS 2008)* May 18, 2008, pp. 948-951, IEEE, Piscataway, New Jersey, USA.

Laroche, Isabelle et al., "An Efficient VLSI Architecture of a Layered Space-Time Receiver," *Proc. of the IEEE 65th Vehicular Technology Conference*, Apr. 1, 2007, pp. 387-391, IEEE, Piscataway, New Jersey, USA.

Omidi, Mohammmad Javad et al., "Parallel Structures for Joint Channel Estimation and Data Detection over Fading Channels," *IEEE Journal on Selected Areas in Communications*, Dec. 1998, pp. 1616-1629, vol. 16, No. 9, IEEE, Piscataway, New Jersey, USA.

SYSTOLIC ARRAY FOR CHOLESKY DECOMPOSITION

FIELD OF THE INVENTION

The disclosed embodiments generally relate to matrix decomposition.

BACKGROUND

Matrix decomposition refers to the transformation of a given matrix into a canonical form. The decomposition process is also known as matrix factorization. Matrix decomposition is utilized in many applications to solve linear algebraic systems. Several decomposition methods, such as QR decomposition, factorize a matrix into arbitrary Q and R matrices. Cholesky decomposition is a particularly efficient method for decomposing matrices that are symmetric and have positive eigenvalues. When these conditions are true, the matrix will decompose into two triangular matrices that are the Hermitian transpose of one another. Instead of determining lower and upper triangular factors Q and R, Cholesky decomposition constructs a lower triangular matrix L whose Hermitian transpose $L^H$ can itself serve as the upper triangular part. Cholesky decomposition is utilized in a number of communication and signal processing applications including, but not limited to, linear least square computation, non-linear optimization, Monte Carlo simulation, Kalman filtration, etc.

The disclosed embodiments address one or more issues arising from matrix decomposition.

SUMMARY

In one embodiment, a systolic array for Cholesky decomposition of an N×N matrix is provided. A plurality of processing cells, including a corner cell, N−1 boundary cells, and $(N^2-3N+2)/2$ internal cells, are arranged into N−1 rows and N columns of processing cells. The first row begins with the corner cell at column 1 and continues with a boundary cell followed by N−2 internal cells. Each row M, M≠1, begins with a boundary cell at column M+1 and continues with N−M−1 internal cells, where $2 \leq M \leq N$. Each processing cell located in row M and column L ($PC_{M,L}$) is configured to receive and process N sets of values. Each set j of the N sets includes a value $X_j$ received on an input X for L>=1 and a value $Y_j$ received on an input Y for L>1. Each internal $PC_{M,L}$ is configured to compute a value $A=X_j-Y_1*Y_j$ and output the value A to the input Y of the $PC_{M+1,L}$ for M<N and sets j>1. Each internal cell $PC_{M,L}$ is further configured to select a value $B=Y_j$ and output the value B to the input X of the $PC_{M,L+1}$ for L<=N and sets j>=1. Each boundary $PC_{M,L}$ is configured to compute a value $C=(X_j-Y_1*Y_j)/((X_1-Y_1^2)^{1/2})$ and output the value C to the input Y of the $PC_{M+1,L+1}$ for L<N and sets j>1. Each boundary $PC_{M,L}$ is further configured to select a value $D=Y_j$, output the value D to the input Y of the $PC_{M,L+1}$ for L<N and sets j>=1, compute a value $Rb1=Y_1^2/(X_1-Y_1^2)^{1/2}$, output the value Rb1, select a value $Rb2=Y_1$, and output the value Rb2. The corner cell $PC_{1,1}$ is configured to compute a value $D=X_j/(X_1^{1/2})$ and output the value D to the input Y of the $PC_{1,2}$ for sets j>1. The corner cell $PC_{1,1}$ also computes a value $Rc=X_1/(X_1^{1/2})$ and outputs the value Rc.

In another embodiment, each internal $PC_{M,L}$ is further configured to output a value Ri, the value Ri being equal to $Y_1$ ($Ri=Y_1$).

The result Ri of internal $PC_{M,L}$ corresponds to the element at row M and column L of a factored output matrix in another embodiment. The result Rb1 of boundary $PC_{M,L}$ corresponds to the element at row M+1 and column L of the factored output matrix. The result Rb2 of $PC_{M,L}$ corresponds to the element at row M and column L of the factored output matrix. The result Rc of corner $PC_{1,1}$ corresponds to the element at row 1 and column 1 of the factored output matrix.

In another embodiment, each boundary cell $PC_{M,L}$ is further configured to output a result $Ri_j$ for each set of values j<(N−L), where the value $Ri_j=Y_j$.

The result $Ri_j$ of boundary cell $PC_{M,L}$ corresponds to the element at row M and column N+1−j of a factored output matrix in another embodiment. The result Rb1 of boundary $PC_{M,L}$ corresponds to the element at row M+1 and column L of the factored output matrix. The result Rb2 of $PC_{M,L}$ corresponds to the element at row M and column L of the factored output matrix. The result Rc of corner $PC_{1,1}$ corresponds to the element at row 1 and column 1 of the factored output matrix.

The $PC_{1,L}$ is coupled and configured to receive the value $X_j$ from the element located at row j and column L of the N×N matrix in another embodiment.

In another embodiment, the processing cells are configured to output results Ri, Rb1, Rb2, and Rc in response to a control signal The processing cells are configured to output respective results Ri, Rb1, Rb2, and Rc as they are generated in another embodiment.

In another embodiment, each internal cell includes an input, $I_x$, and an input, $I_y$. A register is coupled to $I_y$ and is configured to store and output a first value received from $I_y$ until the systolic array is reset. A multiplication circuit has a first input coupled to an output of the register and a second input coupled to $I_y$. A subtraction circuit is coupled to $I_x$ and to output of the multiplication circuit. The subtraction circuit is configured to subtract a value output from the multiplication circuit from a value at $I_x$ and output a result on an output, $O_A$, of the internal cell. An output, $O_Y$, is coupled to $I_y$, and an output, $O_Z$, is coupled to the output of the register.

Each boundary cell, in another embodiment, includes an input, $I_x$, an input, $I_y$, and first, second, third, and fourth outputs, the first output being coupled to $I_y$. A first register has an input coupled to $I_y$ and an output coupled to the second output of the boundary cell. The first register is configured to store and output a first value received from $I_y$ until the systolic array is reset. A first multiplication circuit has a first input coupled to an output of the first register and a second input coupled to $I_y$. A subtraction circuit is coupled to $I_x$ and to an output of the first multiplication circuit. The subtraction circuit is configured to subtract a value output from the first multiplication circuit from a value at $I_x$. An inverse square root circuit has an input coupled to an output of the subtraction circuit. A second multiplication circuit has a first input coupled to the output of the subtraction circuit and a second input coupled to an output of the inverse square root circuit. A second register is coupled to the output of the inverse square root circuit and is configured to store and output a first value received from the output of the inverse square root circuit until the systolic array is reset. A third multiplication circuit has a first input coupled to an output of the second register, a second input coupled to the output of the subtraction circuit, and an output coupled to the third output of the boundary cell. A third register has an input coupled to an output of the second multiplication circuit and an output coupled to the fourth output of the boundary cell. The third register is configured to store and output a first value received from the output of the second multiplication circuit until the systolic array is reset.

In another embodiment, the corner cell includes an input and first and second outputs. An inverse square root circuit has an input coupled to the input of the corner cell. A first multiplication circuit has a first input coupled to the input of the corner cell and a second input coupled to the output of the inverse square root circuit. A first register has an input coupled to an output of the first multiplication circuit and an output coupled to the first output of the corner cell. The first register is configured to store and output a first value received from the output of the first multiplication circuit until the systolic array is reset. A second register has an input coupled to an output of the inverse square root circuit. The second register is configured to store and output a first value received from the output of the inverse square root circuit until the systolic array is reset. A second multiplication circuit has a first input coupled to an output of the second register, a second input coupled to the input of the corner cell, and an output coupled to the second output of the corner cell.

In another embodiment, a systolic array for Cholesky decomposition of an N×N matrix is provided. A plurality of processing cells, including a corner cell, N−1 boundary cells, and $(N^2-3N+2)/2$ internal cells, are arranged into N−1 rows and N columns of processing cells. The first row begins with the corner cell at column 1 and continues with a boundary cell followed by N−2 internal cells. Each row M, M≠1, begins with a boundary cell at column M+1 and continues with N-M−1 internal cells, where $2 \leq M \leq N$. Each row of the processing cells is configured to calculate elements of a respective column of a lower triangular output matrix. Each processing cell of each row is configured to determine a value of a respective element of the lower triangular output matrix using a value of the element calculated in the previous processing cell of the row.

The systolic array, in another embodiment, has each boundary cell configured to determine a value of a respective diagonal element of the lower triangular matrix using a value determined by the boundary cell of a previous adjacent row of the systolic array.

In another embodiment, each boundary processing cell is further configured to determine a value of a first non-diagonal element of the column of the lower triangular matrix.

Each boundary cell, in another embodiment, is further configured with shared hardware that determines the value of the respective diagonal element and determines the value of the first non-diagonal element.

In another embodiment, each processing cell located in row M and column L ($PC_{M,L}$) is configured to receive and process N sets of values, each set j of the N sets including a value $X_j$ received on an input X for L>=1 and a value $Y_j$ received on an input Y for L>1. Each internal $PC_{M,L}$ is configured to compute a value $A=X_j-Y_1*Y_j$ and output the value A to the input Y of the $PC_{M+1,L}$ for M<N and sets j>1. The internal $PC_{M,L}$ is further configured to select a value $B=Y_j$ and output the value B to the input X of the $PC_{M,L+1}$, for L<=N and sets j>=1. Each boundary $PC_{M,L}$ is configured to compute a value $C=(X_j-Y_1*Y_j)/((X_1-Y_1^2)^{1/2}))$ and output the value C to the input Y of the $PC_{M+1,L+1}$ for L<N and sets j>1. The boundary $PC_{M,L}$ is further configured to select a value $D=Y_j$ and output the value D to the input Y of the $PC_{M,L+1}$, for L<N and sets j>=1, and compute a result $Rb1=(X_1-Y_1^2)/(X_1-Y_1^2)^{1/2}$ and output the result Rb1. The boundary $PC_{M,L}$ selects a value $Rb2=Y_1$ and outputs the value Rb2. The corner $PC_{1,1}$ is configured to compute a value $D=X_j/(X_1^{1/2})$ and output the value D to the input Y of the $PC_{1,2}$ for sets j>1. The corner $PC_{1,1}$ is further configured to compute a value $Rc=X_1/(X_1^{1/2})$ and output the value Rc.

Each internal $PC_{M,L}$, in another embodiment, is further configured to output a value Ri, where the value $Ri=Y_1$.

In another embodiment, the value Ri of internal $PC_{M,L}$ corresponds to the element at row M and column L of a factored output matrix. The value Rb1 of boundary $PC_{M,L}$ corresponds to an element at row M+1 and column L of the factored output matrix. The value Rb2 of $PC_{M,L}$ corresponds to an element at row M and column L of the factored output matrix, and the value Rc of corner $PC_{1,1}$ corresponds to an element at row 1 and column 1 of the factored output matrix.

Each boundary cell $PC_{M,L}$, in another embodiment, is further configured to output a value $Ri_j$ for each set of values j<(N−L), where the value $Ri_j=Y_j$.

In another embodiment, an article of manufacture is provided. The article of manufacture includes a data storage medium configured with non-transitory configuration data that when loaded onto a programmable integrated circuit cause a set of programmable elements to operate as a systolic array for Cholesky decomposition of an N×N matrix. The systolic array has a plurality of processing cells, including a corner cell, N−1 boundary cells, and $(N^2-3N+2)/2$ internal cells. The processing cells are arranged into N−1 rows and N columns of processing cells. Row 1 begins with the corner cell at column 1 and continues with a boundary cell followed by N−2 internal cells. Each row M, M≠1, begins with a boundary cell at column M+1 and continues with N-M−1 internal cells, wherein $2 \leq M \leq N$. Each processing cell located in row M and column L ($PC_{M,L}$) is configured to receive and process N sets of values, each set j of the N sets including a value N received on an input X for L>=1 and a value $Y_j$ received on an input Y for L>1. Each internal $PC_{M,L}$ is configured to compute a value $A=X_j-Y_1*Y_j$ and output the value A to the input Y of the $PC_{M+1,L}$ for M<N and sets j>1. Each internal $PC_{M,L}$ is further configured to select a value $B=Y_j$ and output the value B to the input X of the $PC_{M,L+1}$, for L<=N and sets j>=1. Each boundary $PC_{M,L}$ is configured to compute a value $C=(X_j-Y_1*Y_j)/(X_1-Y_1^2)^{1/2})$ and output the value C to the input Y of the $PC_{M+1,L+1}$ for L<N and sets j>1. Each boundary $PC_{M,L}$ is further configured to select a value $D=Y_j$ and output the value D to the input Y of the $PC_{M,L+1}$, for L<N and sets j>=1. The boundary $PC_{M,L}$ is further configured to compute a value $Rb1=(X_1-Y_1^2)/(X_1-Y_1^2)^{1/2}$ output the value Rb1, select a value $Rb2=Y_1$, and output the value Rb2. The corner $PC_{1,1}$ is configured to compute a value $D=X_j/(X_1^{1/2})$ and output the value D to the input Y of the $PC_{1,2}$ for sets j>1. The corner $PC_{1,1}$ is further configured to compute a value $Rc=X_1/(X_1^{1/2})$ and output the value Rc.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Cholesky decomposition is a method for matrix decomposition that is particularly suited for many applications in communications and signal processing. Matrix decomposition is generally performed as one step in a larger process. The decomposition step is often performed a large number of times and may limit throughput in high-speed applications. Many applications, such as 3GPP-LTE wireless communication, require a hardware implementation for decomposition that is scalable and is capable of high throughput. The embodiments of the present invention provide scalable, high throughput systolic arrays for performing Cholesky decomposition.

Cholesky decomposition is a particularly efficient method for decomposing real matrices that are symmetric and have positive eigenvalues and complex matrices that are Hermitian symmetric and have positive eigenvalues also called positive semi-definite matrices. A matrix is symmetric when each element in row i column j is equal to the element in row j column i. For Hermitian symmetric complex matrices, the elements in row i column j are equal to the conjugate of the element in row j column i. When these conditions are true, Cholesky decomposition may be used to efficiently decompose a matrix into two triangular matrices that are transposes (conjugate transpose in case of complex matrices) of one another. Unlike other methods that decompose a matrix into arbitrary lower and upper triangular factors, such as LU and QR decomposition, Cholesky decomposition exploits the structure of symmetric matrices to construct a lower triangular matrix L whose transpose is equal to the upper triangular factor $L^T$. For complex matrices, the lower triangular matrix L is equal to the conjugate transpose of the upper triangular matrix $L^H$. Cholesky decomposition is perhaps the most efficient way of decomposing Hermitian symmetric, positive semi-definite matrices.

For a Hermitian symmetric complex matrix A having positive eigenvalues, Cholesky decomposition is defined as:

$$A = LL^H$$

where L is a lower triangular matrix. The L is also called the square-root factor or decomposition of the matrix A. Cholesky decomposition may also be referred to as square-root decomposition and such terms may be used interchangeably herein. After the square-root factor L is determined, the upper triangular matrix $L^H$ can be determined by performing the transformation of the lower triangular matrix L.

Example 1 shows pseudo-code of one method for computing the Cholesky decomposition of a matrix A.

for k=1:n
if A(k,k)<0, {matrix is not positive definite!}
A(k,k)=A(k+1,k)/A(k,k)
for j=k+1:n,
  A(j:n,j)=A(j:n, j)−A(j:n,k)A(j,k)
end
end Example 1

As illustrated in Example 1, processes of Cholesky decomposition may be performed in an order in which the elements of the lower triangular matrix L are calculated such that the each newly computed element is expressed in terms of elements which have already been computed. In this example, the outer for loop iterates through the columns from left to right with index k. In each column k, the eigenvalue elements of lower triangular matrix L (referred to as diagonal elements herein) are first computed. The inner for loop determines elements of a column located in each row j below the determined diagonal element.

A systolic array is an interconnected matrix of individual signal processing units or cells, where overall operation of the systolic array depends upon functions of the individual signal processing cells and the interconnection scheme of such signal processing cells. A clock signal may be applied to a systolic array to control data flow through each cell. Alternatively, operations of an individual cell may be triggered by the arrival of input data objects. The interconnection scheme of some systolic arrays may include interconnects only between nearest neighbor signal processing cells within a systolic array. However, interconnection schemes are not limited to having only nearest neighbor interconnects.

In matrix processing operations, matrix elements are passed between cells according to element relationships and the function to be performed. For example, matrix multiplication is performed by inputting one row of the matrix at a time to the top row of the array, and passing outputs from the cells down the rows of the array. The other matrix is input one column at a time to the left column of the array, and passing outputs from the cells from left to right across columns of the array. When each cell has processed one whole row and one whole column, the result of the multiplication is stored in the array and can then be output a row or a column at a time, flowing across or down the array.

In one embodiment, a systolic array is provided that is structured to perform Cholesky decomposition in a manner that utilizes previously computed elements to efficiently compute the lower triangular matrix L. The systolic array is implemented in a hardware efficient topology that is easily scalable as the size of the input matrix increases.

Figure 1:
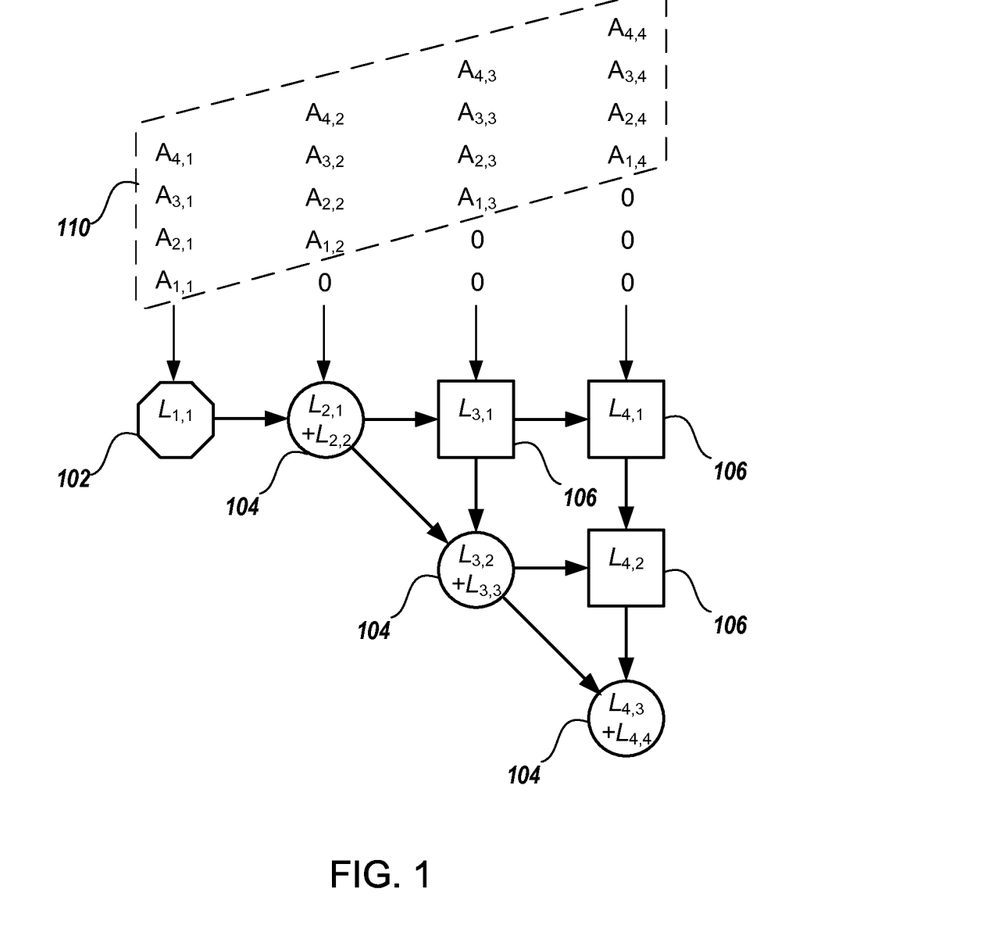
FIG. 1 shows a block diagram of an example systolic array implemented in accordance with one embodiment.

FIG. 1 shows a block diagram of an example systolic array implemented in accordance with one embodiment. The systolic array includes three types of processing cells: a corner cell 102, boundary cells 104, and internal cells 106. The example shows how an N×N array can be decomposed with a systolic array including only (N(N−1))/2 processing cells. The embodiments provide an easily scalable solution for performing Cholesky decomposition. The processing cells are arranged into N−1 rows and N columns. The first row begins with the corner cell at column 1 and continues with a boundary cell followed by N−2 internal cells. Each row M of processing cells other than the first row begins with a boundary cell at column M+1 and continues with N−M−1 internal cells.

Each row is configured to calculate elements of one column of the lower triangular matrix. The processing cells in each row are configured to avoid unnecessary processing by utilizing the value of the matrix element calculated in the previous processing cell of the row.

Likewise, the determined value of a diagonal element is used in determining the next diagonal element in the next adjacent row. As discussed in detail below, the processes subsequent to determining the diagonal element of the next column and the non-diagonal element of the next row share several common processes. This embodiment further avoids unnecessary hardware and processing by determining a diagonal and a non-diagonal element within each of the boundary cells 104. For example, the boundary cell 104 in the first row of the systolic array calculates the non-diagonal element located in row 2 column 1 of the lower triangular matrix and calculates the diagonal element located in row 2, column 2 of the lower triangular matrix. Through the reuse of data values and hardware to avoid unnecessary processing, scalability and throughput are increased.

In processing matrix A (110), columns are input to processing cells, one row at a time, as shown. Due to clock delays, zero padding is used for the calculations to be performed directly. Accordingly, a first input row input into the systolic array is $A_{1,1}$, 0, 0, 0; the second row input includes values $A_{2,1}$, $A_{1,2}$, 0, 0; etc. As matrix A is input, decomposition is performed, leaving each processing cell with trained register values containing elements of lower triangular matrix L.

Figure 2:
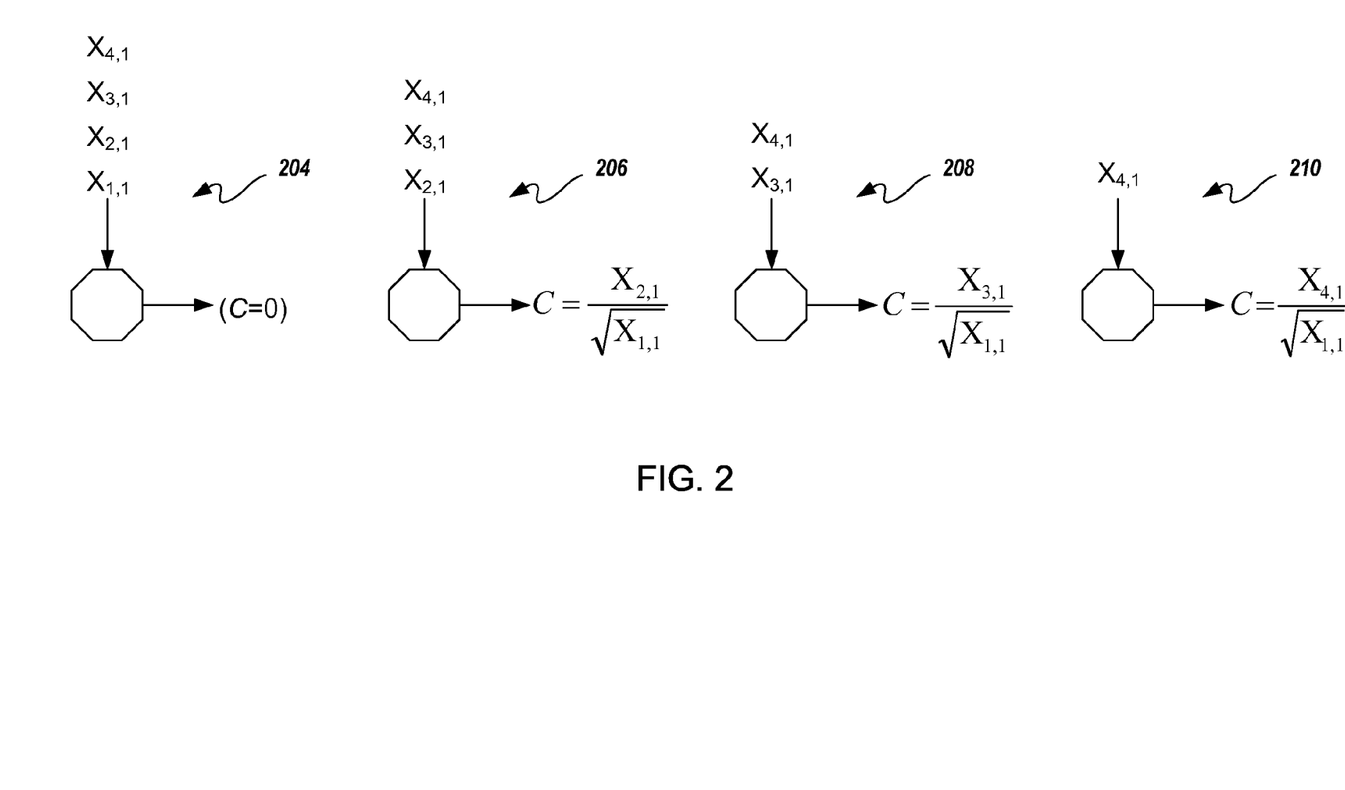
FIG. 2 illustrates the structure and operation of the corner cell shown in FIG. 1.

FIG. 2 illustrates the function of the corner processing cell. The corner processing cell 204 (or "corner cell" for brevity) includes an input X and an output C. In this example, the corner cell is configured to store two internal variables CVAR.R and CVAR.S, which are each initialized to the value of zero. Example 2 shows pseudo-code of the process performed by the corner cell.

q=1/√X
if (CVAR.R==0)
　CVAR.R=X*q;
　CVAR.S=q;
　C=0;
else
　C=q*CVAR.S;
end

Example 2

In performing Cholesky decomposition, the value of the internal variable CVAR.R becomes trained with the value equal to:

$$CVAR.R = \frac{X_{1,1}}{\sqrt{X_{1,1}}}$$

Processing cells 204, 206, 208, and 210 of FIG. 2 illustrate snapshots of the input and output C of the corner cell in processing a 4×4 matrix.

Figure 3:
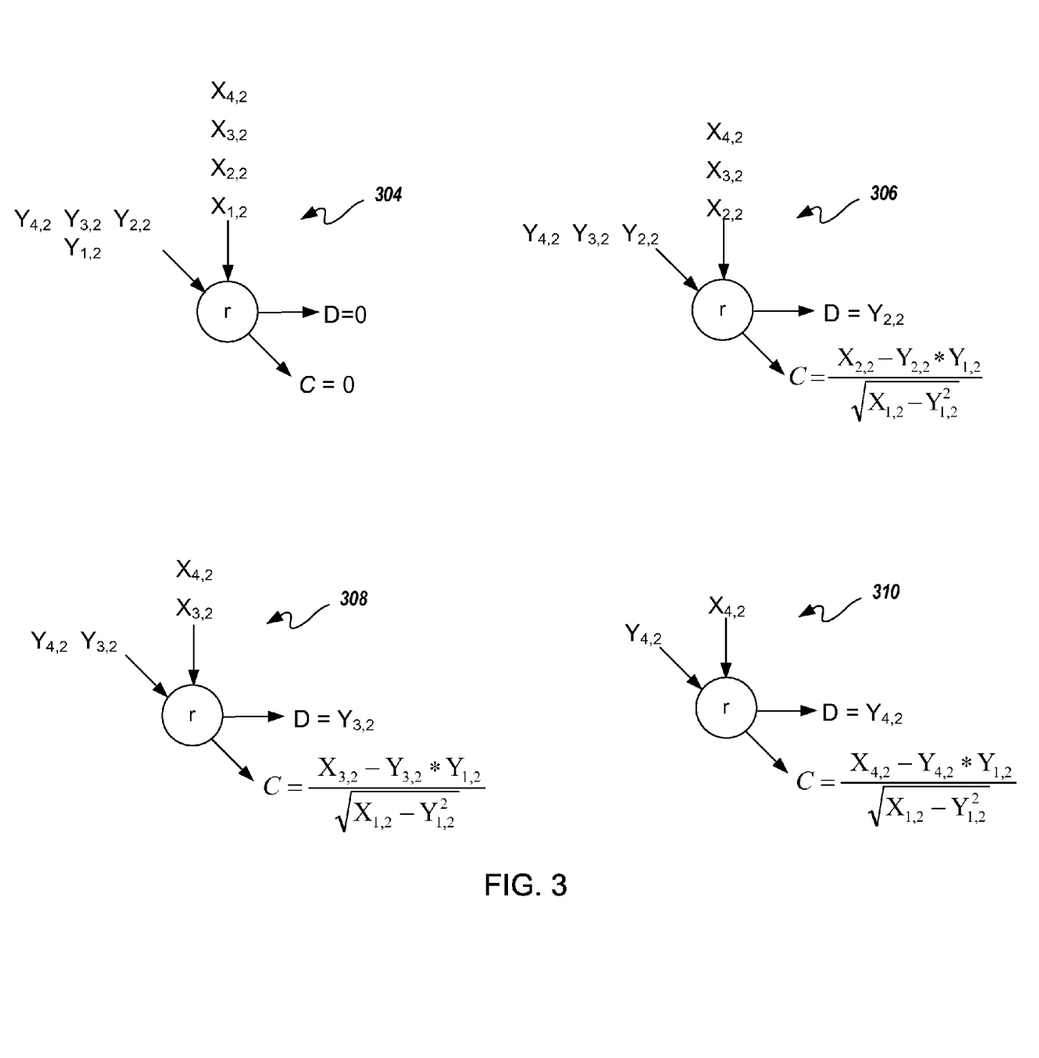
FIG. 3 illustrates the structure and operation of the boundary cell shown in FIG. 1.

FIG. 3 illustrates the function of each boundary processing cell. The boundary processing cell 304 includes inputs X and Y and outputs D and C. For a boundary processing cell located in row M and column L (denoted as "$PC_{M,L}$") of the systolic array, the input values X are received from the output A of the internal $PC_{M-1,L}$ (described below) and input values Y are received from the C output of boundary $PC_{M-1,L-1}$. If the boundary processing cell (or "boundary cell" for brevity) is located in the first row of the systolic array, the input value X is input from the input matrix and input values Y are received from the C output of the corner cell.

In this example, the boundary cell is configured to store three internal variables BVAR.R, BVAR.S, and BVAR.Z, which are each initialized to the value of zero. Example 3 shows pseudo-code of the process performed by the boundary cell.

if (BVAR.S==0) BVAR.S=Y;
else D=Y;
p=X−Y*BVAR.S;
q=1/√p
if (BVAR.R==0)
　BVAR.R=p*q;
　BVAR.Z=q;
　C=0;
else
　C=p*BVAR.Z;
end Example 3

In performing Cholesky decomposition, the value of the internal variable BVAR.R becomes trained with the value equal to:

$$BVAR.R = \frac{X_{1,1}}{\sqrt{X_{1,1}}}$$

and BVAR.S becomes trained with the value equal to:

BVAR.S=$Y_1$

Processing cells 304, 306, 308, and 310 of FIG. 3, illustrate snapshots of the input and output of an example one of the boundary cells in processing a 4×4 matrix.

Figure 4:
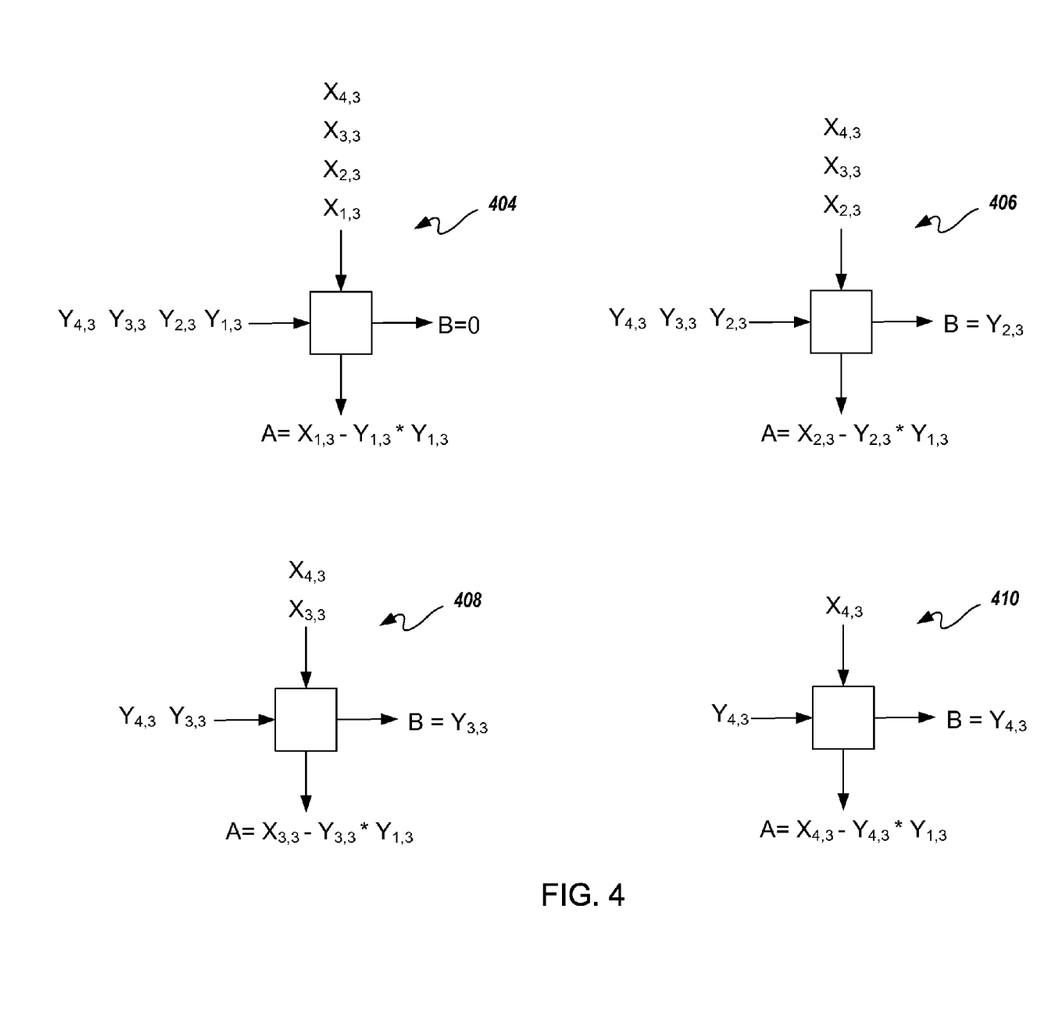
FIG. 4 illustrates the structure and operation of the internal cell shown in FIG. 1.

FIG. 4 illustrates the function of each internal processing cell. The internal processing cell 404 includes inputs X and Y and outputs A and B. For an internal processing cell located in row M and column L (denoted as "$PC_{M,L}$") of the systolic array, the input values X are received from output A of internal $PC_{M-1,L}$ and input values Y are received from output D of boundary $PC_{M,L-1}$. If the internal processing cell (or "internal cell" for brevity) is located in the first row of the systolic array, the input value X is instead input from the input matrix.

In this example, the internal cell is configured to store one internal variable IVAR.S, which is initialized to the value of zero. Example 4 shows pseudo-code of the process performed by the internal cell.

if (IVAR.S==0) IVAR.S=Y;
else B=Y;
A=X−Y*IVAR.S;

Example 4

In performing Cholesky decomposition, the value of the internal variable IVAR.R becomes trained with the value equal to:

IVAR.R=$Y_1$

Processing cells 404, 406, 408, and 410 of FIG. 4 illustrate snapshots of the input and output of an example one of the internal cells in processing a 4×4 matrix.

Figure 5:
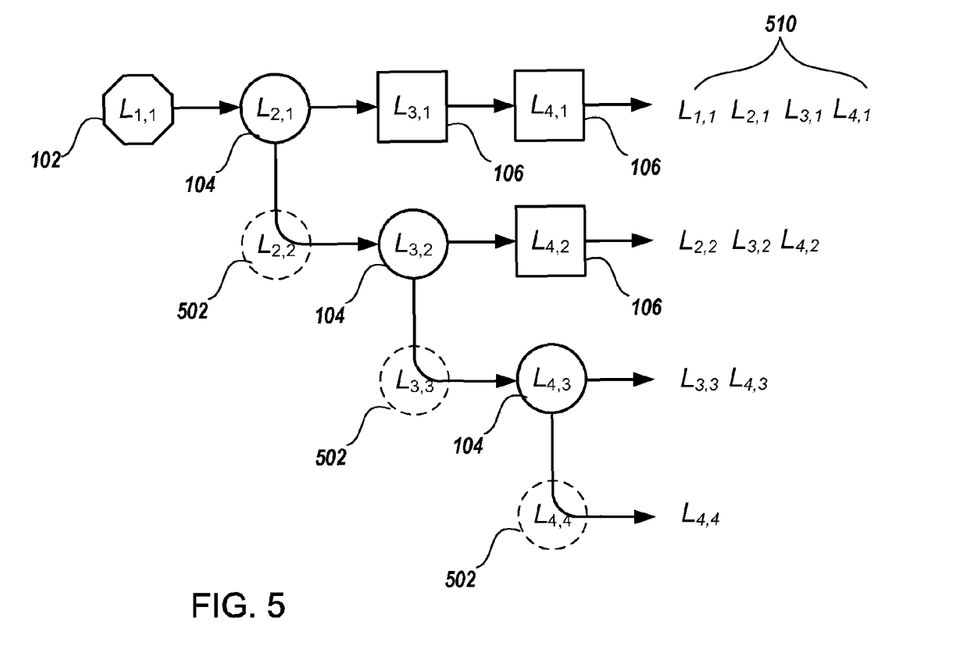
FIG. 5 illustrates how the lower triangular matrix L is read as output of the trained systolic array in accordance with one embodiment.

FIG. 5 illustrates how the lower triangular matrix L is read as output of the trained systolic array in accordance with one embodiment. Once training of the systolic array is complete, the Cholesky-factored lower triangular matrix L (510) is stored in the internal variables as shown in FIG. 1. The triangular matrix L can be read from the processing cells as follows. The diagonal elements of the L matrix are available in the CVAR.R and BVAR.R storage.

For the decomposition of a 4×4 matrix, diagonal elements are stored in the following internal variables:
　L(1,1)=CVAR1.R
　L(2,2)=BVAR1.R
　L(3,3)=BVAR2.R
　L(4,4)=BVAR3.R The first non-diagonal elements following the diagonal elements in each column in the L matrix are stored in the BVAR.S storage as follows:

L(2,1)=BVAR1.S
L(3,2)=BVAR2.S
L(4,3)=BVAR3.S

The other non-diagonal elements are stored in the internal cells as follows:

L(3,1)=IVAR1.S
L(4,1)=IVAR2.S
L(4,2)=IVAR3.S

In the implementation shown in FIG. 5, elements stored corner cell 102 and internal processing cells 106 and non-diagonal elements stored in BVAR.S of boundary cells 104 are passed out the right side of the array. Diagonal elements 502 stored in BVAR.S of boundary cells 104 are passed down one row of the systolic array. In this manner, the lower triangular matrix is properly ordered when output from the systolic array. One skilled in the art will recognize that the lower triangular matrix L may be output from the systolic array using a number of other methods.

For example, the C output of the boundary cells can be captured to provide all the non-diagonal elements as they are generated in each processing clock cycle. The captured non-diagonal elements may be output in column-wise manner. The first boundary cell will provide the elements of the first column, except the diagonal element. The second boundary cell will provide the non-diagonal elements of the second column, the third boundary cell will provide the non-diagonal elements of the third column, and so on.

Figure 6:
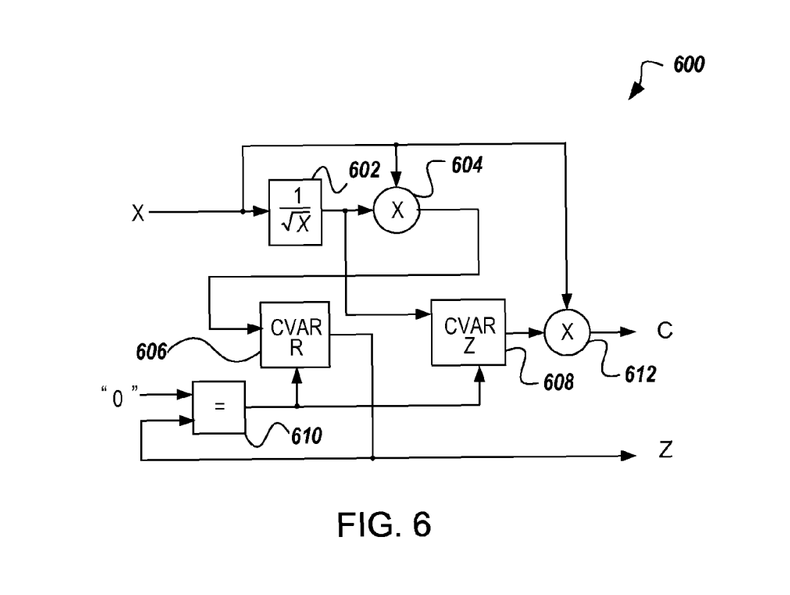
FIG. 6 shows a circuit diagram of a corner cell implemented in accordance with one embodiment.

FIG. 6 is a block diagram of a circuit depicting an example embodiment of a processing cell that may be used for implementing the corner cell shown in FIG. 2. Corner cell 600 includes an inverse square root circuit 602 having an input coupled to the input X of the corner cell. Multiplication circuit 604 is coupled to multiply the input of the corner cell X by the output of the inverse square root circuit 602. Register 606 is configured to store and output the first value output from the first multiplication circuit. Register 608 is configured to store and output the first value output from the inverse square root circuit. The registers are selectably enabled by comparison circuit 610, which prevents registers 606 and 608 from overwriting the first stored values until the systolic array is reset. Multiplication circuit 612 multiplies the output of the register 608 by the input X of the corner cell. Output of multiplication circuit 612 is the output C of the corner cell. CVAR.R can be read out of register 606 on an output of the corner cell Z.

Figure 7:
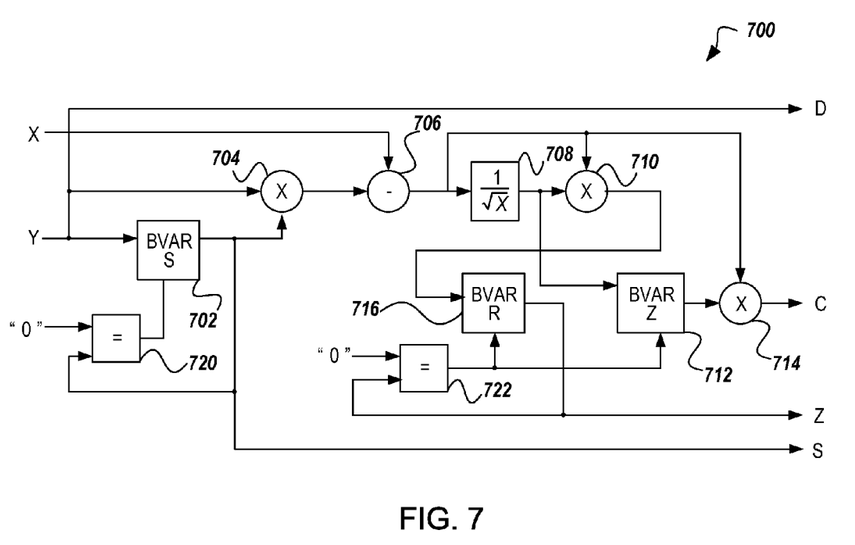
FIG. 7 shows a circuit diagram of a boundary cell implemented in accordance with one embodiment.

FIG. 7 is a block diagram of a circuit depicting an exemplary embodiment of a processing cell that may be used for implementing a boundary cell shown in FIG. 3. Boundary cell 700 includes a register 702 configured to store the first value received on the input Y. Multiplication circuit 704 multiplies the output of register 702 with values received on input Y. Subtraction circuit 706 subtracts the output of multiplication circuit 704 from values received on input X of the boundary cell. Inverse square root circuit 708 is coupled to the output of the subtraction circuit 706. A second multiplication circuit 710 multiplies the output of the subtraction circuit 706 by the output of the inverse square root circuit 708. A second register 712 stores the first value output from the inverse square root circuit 708. A third multiplication circuit 714 multiplies the output of the second register 712 by the output of the subtraction circuit 706. The output of multiplication circuit 714 is coupled to output C of the boundary cell. The input Y is coupled to output D of the boundary cell. A third register 716 stores the first value output from multiplication circuit 710. Comparison circuits 720 and 722 are configured to prevent registers 702, 712, and 716 from overwriting the first stored values until the systolic array is reset. The output of register 716 is coupled to the output Z of the boundary cell, and the output of register 702 is coupled to the output S of the boundary cell.

Figure 8:
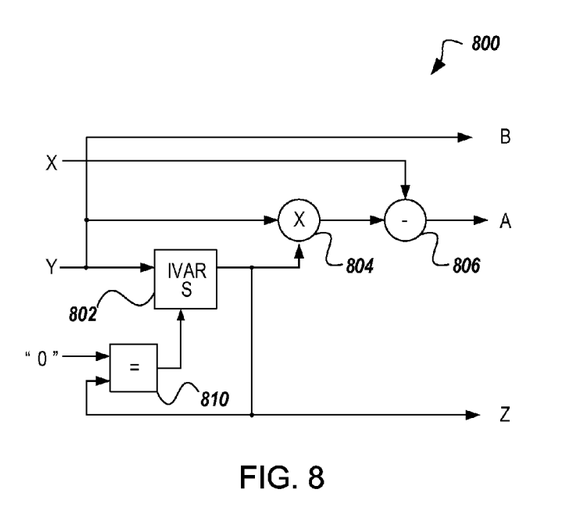
FIG. 8 shows a circuit diagram of an internal cell implemented in accordance with one embodiment.

FIG. 8 is a block diagram of a circuit depicting an exemplary embodiment of a processing cell that may be used for implementing the internal cell shown in FIG. 2. Internal cell 800 includes a register 802 configured to store the first value received on the input Y. Input Y is also coupled to output B of the internal cell. Multiplication circuit 804 multiplies the output of register 802 with values received on input Y. Subtraction circuit 806 subtracts the output of multiplication circuit 804 from values received on input X of the boundary cell. The output of subtraction circuit 806 is coupled to output A of the internal cell. Register 802 is selectably enabled by comparison circuit 810, which prevents the register from overwriting the stored value until the systolic array is reset. The output of register 802 is coupled to the output Z of the internal cell.

Figure 9:
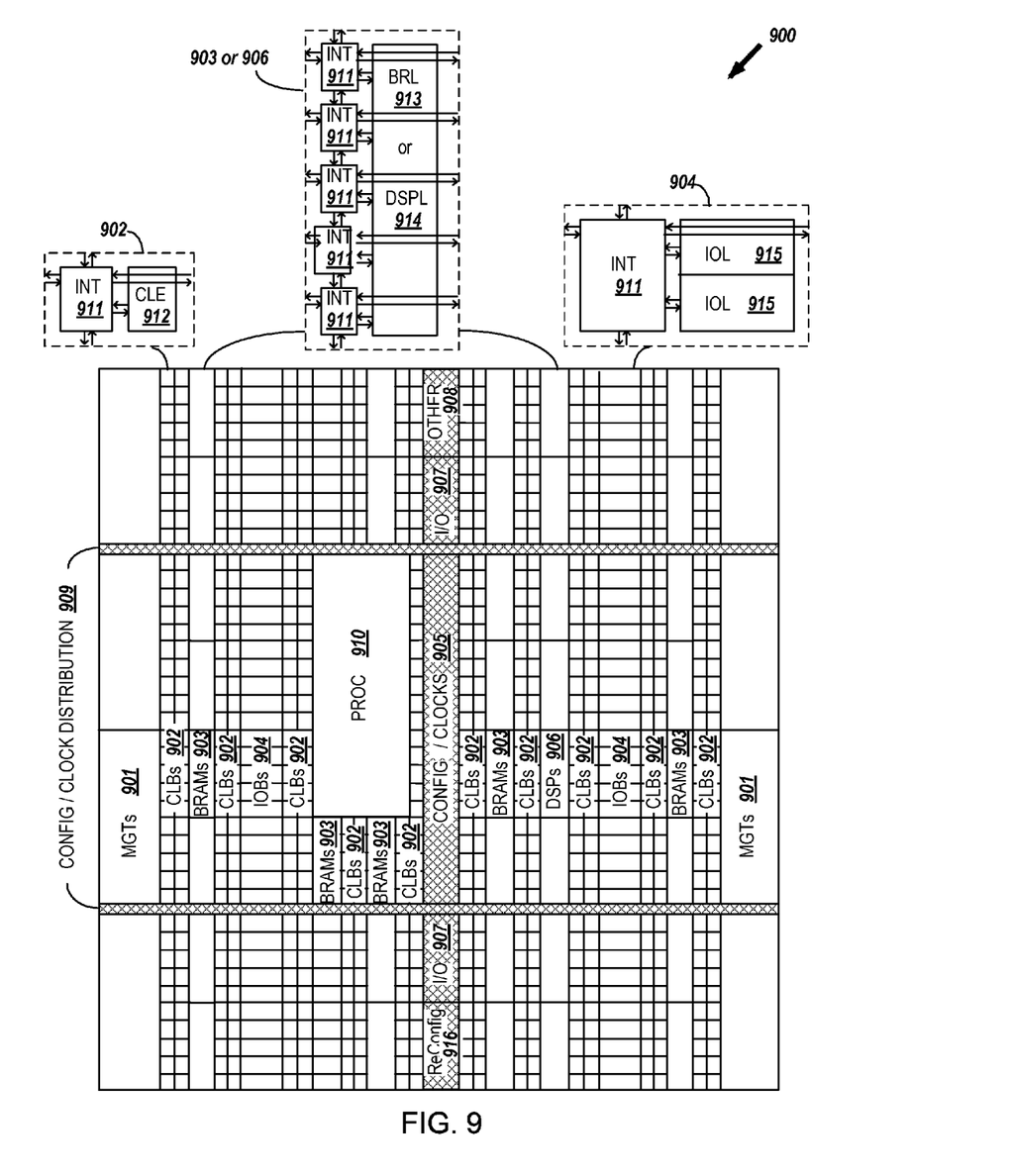
FIG. 9 is a block diagram of an example programmable integrated circuit that may be configured to implement a systolic array for Cholesky decomposition.

FIG. 9 is a block diagram of a programmable integrated circuit, specifically an FPGA, which may be configured to implement systolic array circuits such as those described herein. The programmable integrated circuit of FIG. 9 may be programmed using a data storage medium configured with non-transitory configuration data that when loaded onto a programmable integrated circuit cause a set of programmable elements to operate as a systolic array for Cholesky decomposition.

FPGAs and other programmable integrated circuits can include several different types of programmable logic blocks in the array. For example, FIG. 9 illustrates an FPGA architecture (900) that includes a large number of different programmable tiles including multi-gigabit transceivers (MGTs 901), configurable logic blocks (CLBs 902), random access memory blocks (BRAMs 903), input/output blocks (IOBs 904), configuration and clocking logic (CONFIG/CLOCKS 905), digital signal processing blocks (DSPs 906), a reconfiguration port (RECONFIG. 916), specialized input/output blocks (I/O 907), for example, clock ports, and other programmable logic 908 such as digital clock managers, analog-to-digital converters, system monitoring logic, and so forth. Some FPGAs also include dedicated processor blocks (PROC 910).

In some FPGAs, each programmable tile includes a programmable interconnect element (INT 911) having standardized connections to and from a corresponding interconnect element in each adjacent tile. Therefore, the programmable interconnect elements taken together implement the programmable interconnect structure for the illustrated FPGA. The programmable interconnect element INT 911 also includes the connections to and from the programmable logic element within the same tile, as shown by the examples included at the top of FIG. 9.

For example, a CLB 902 can include a configurable logic element CLE 912 that can be programmed to implement user logic plus a single programmable interconnect element INT 911. A BRAM 903 can include a BRAM logic element (BRL 913) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 906 can include a DSP logic element (DSPL 914) in addition to an appropriate number of programmable interconnect elements. An IOB 904 can include, for example, two instances of an input/output logic element (IOL 915) in addition to one instance of the programmable interconnect element INT 911. As will be clear to those of skill in the art, the actual I/O pads connected, for example, to the I/O logic element 915 are manufactured using metal layered above the various illustrated logic blocks, and typically are not confined to the area of the input/output logic element 915.

In the pictured embodiment, a columnar area near the center of the die (shown shaded in FIG. 9) is used for configuration, clock, and other control logic. Horizontal areas 909 extending from this column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic. For example, the processor block PROC 910 shown in FIG. 9 spans several columns of CLBs and BRAMs.

Note that FIG. 9 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual FPGA more than one adjacent column of CLBs is typically included wherever the CLBs appear, to facilitate the efficient implementation of user logic.

The present invention is thought to be applicable to a variety of applications utilizing Cholesky decomposition. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A systolic array for Cholesky decomposition of an N×N matrix, comprising:
    a plurality of processing cells, including a corner cell, N−1 boundary cells, and $(N^2−3N+2)/2$ internal cells;
    wherein the processing cells are arranged into N−1 rows and N columns of processing cells, row 1 beginning with the corner cell at column 1 and continuing with a boundary cell followed by N−2 internal cells, and each row M, M≠1, beginning with a boundary cell at column M+1 and continuing with N−M−1 internal cells, wherein $2 \leq M \leq N$;
    wherein each processing cell located in row M and column L ($PC_{M,L}$) is configured to receive and process N sets of values, each set j of the N sets including a value $X_j$ received on an input X for L>=1 and a value $Y_j$ received on an input Y for L>1;
    wherein each internal $PC_{M,L}$ is configured to:
        compute a value $A=X_j−Y_1*Y_j$ and output the value A to the input Y of the $PC_{M+1,L}$ for M<N and sets j>1; and
        select a value $B=Y_j$ and output the value B to the input X of the $PC_{M,L+1}$, for L<=N and sets j>=1;
    wherein each boundary $PC_{M,L}$ is configured to:
        compute a value $C=(X_j−Y_1*Y_j)/((X_1−Y_1^2)^{1/2})$ and output the value C to the input Y of the $PC_{M+1,L+1}$ for L<N and sets j>1;
        select a value $D=Y_j$ and output the value D to the input Y of the $PC_{M,L+1}$, for L<N and sets j>=1;
        compute a value $Rb1=(X_1−Y_1^2)/(X_1−Y_1^2)^{1/2}$ and output the value Rb1; and
        select a value $Rb2=Y_1$ and output the value Rb2; and wherein the corner $PC_{1,1}$ is configured to:
        compute a value $D=X_j/(X_1^{1/2})$ and output the value D to the input Y of the $PC_{1,2}$ for sets j>1; and
        compute a value $Rc=X_1/(X_1^{1/2})$ and output the value Rc.

2. The systolic array of claim 1, wherein each internal $PC_{M,L}$ is further configured to output a value Ri, wherein $Ri=Y_1$.

3. The systolic array of claim 2, wherein the processing cells are configured to output results Ri, Rb1, Rb2, and Rc in response to a control signal.

4. The systolic array of claim 1, wherein:
    the result Ri of internal $PC_{M,L}$ corresponds to an element at row M and column L of a factored output matrix;
    the result Rb1 of boundary $PC_{M,L}$ corresponds to an element at row M+1 and column L of the factored output matrix;
    the result Rb2 of $PC_{M,L}$ corresponds to the element at row M and column L of the factored output matrix; and
    the result Rc of corner $PC_{1,1}$ corresponds to an element at row 1 and column 1 of the factored output matrix.

5. The systolic array of claim 1, wherein each boundary cell $PC_{M,L}$ is further configured to output a result $Ri_j$ for each set of values j<(N−L), where $Ri_j=Y_j$.

6. The systolic array of claim 5, wherein:
    the result $Ri_j$ of boundary cell $PC_{M,L}$ corresponds to an element at row M and column N+1−j of a factored output matrix;
    the result Rb1 of boundary $PC_{M,L}$ corresponds to an element at row M+1 and column L of the factored output matrix;
    the result Rb2 of $PC_{M,L}$ corresponds to the element at row M and column L of the factored output matrix; and
    the result Rc of corner $PC_{1,1}$ corresponds to an element at row 1 and column 1 of the factored output matrix.

7. The systolic array of claim 5, wherein the processing cells are configured to output respective results Ri, Rb1, Rb2, and Rc as the respective results Ri, Rb1, Rb2, and Rc are generated.

8. The systolic array of claim 1, wherein the $PC_{1,L}$ is configured to receive the value $X_j$ from the element located at row j and column L of the N×N matrix.

9. The systolic array of claim 1, wherein each internal cell includes:
    an input, $I_x$, and an input, $I_y$;
    a register coupled to $I_y$ and configured to store and output a first value received from $I_y$ until the systolic array is reset;
    a multiplication circuit having a first input coupled to an output of the register and a second input coupled to $I_y$;
    a subtraction circuit coupled to $I_x$ and to output of the multiplication circuit, the subtraction circuit configured to subtract a value output from the multiplication circuit from a value at $I_x$ and output a result on an output, $O_A$, of the internal cell;
    an output, $O_Y$, coupled to $I_Y$; and
    an output, $O_Z$, coupled to the output of the register.

10. The systolic array of claim 1, wherein each boundary cell includes:
    an input, $I_x$, an input, $I_y$, and first, second, third, and fourth outputs, the first output coupled to $I_y$;
    a first register having an input coupled to $I_y$ and an output coupled to the second output of the boundary cell, the first register configured to store and output a first value received from $I_y$ until the systolic array is reset;
    a first multiplication circuit having a first input coupled to an output of the first register and a second input coupled to $I_y$;

a subtraction circuit coupled to $I_x$ and to an output of the first multiplication circuit and configured to subtract a value output from the first multiplication circuit from a value at $I_x$;

an inverse square root circuit having an input coupled to an output of the subtraction circuit;

a second multiplication circuit having a first input coupled to the output of the subtraction circuit and a second input coupled to an output of the inverse square root circuit;

a second register coupled to the output of the inverse square root circuit and configured to store and output a first value received from the output of the inverse square root circuit until the systolic array is reset;

a third multiplication circuit having a first input coupled to an output of the second register, a second input coupled to the output of the subtraction circuit, and an output coupled to the third output of the boundary cell; and a third register having an input coupled to an output of the second multiplication circuit and an output coupled to the fourth output of the boundary cell, the third register configured to store and output a first value received from the output of the second multiplication circuit until the systolic array is reset.

11. The systolic array of claim 1, wherein the corner cell includes:

an input and first and second outputs;

an inverse square root circuit having an input coupled to the input of the corner cell;

a first multiplication circuit having a first input coupled to the input of the corner cell and a second input coupled to the output of the inverse square root circuit;

a first register having an input coupled to an output of the first multiplication circuit and an output coupled to the first output of the corner cell, the first register configured to store and output a first value received from the output of the first multiplication circuit until the systolic array is reset;

a second register having an input coupled to an output of the inverse square root circuit, the second register configured to store and output a first value received from the output of the inverse square root circuit until the systolic array is reset; and a second multiplication circuit having a first input coupled to an output of the second register, a second input coupled to the input of the corner cell, and an output coupled to the second output of the corner cell.

12. A systolic array for Cholesky decomposition of an N×N matrix, comprising:

a plurality of processing cells, including a corner cell, boundary cells, and internal cells, the processing cells arranged into N−1 rows and N columns of processing cells, a first row beginning with the corner cell at column 1 and continuing with a boundary cell followed by N−2 internal cells, and each row M, M≠1, beginning with a boundary cell at column M+1 and continuing with N−M−1 internal cells, wherein 2≦M≦N;

wherein each row of the processing cells is configured to calculate elements of a respective column of a lower triangular matrix; and wherein each processing cell of each row is configured to determine value of a respective element of the lower triangular matrix using a value of an element calculated in a previous processing cell of the row of the systolic array.

13. The systolic array of claim 12, wherein each boundary cell is configured to determine a value of a respective diagonal element of the lower triangular matrix using a value determined by the boundary cell of a previous adjacent row of the systolic array.

14. The systolic array of claim 13, wherein each boundary processing cell is further configured to determine a value of a first non-diagonal element of the column of the lower triangular matrix.

15. The systolic array of claim 14, wherein each boundary cell is further configured with shared hardware that determines the value of the respective diagonal element and determines the value of the first non-diagonal element.

16. The systolic array of claim 14, wherein:

each processing cell located in row M and column L ($PC_{M,L}$) is configured to receive and process N sets of values, each set j of the N sets including a value $X_j$ received on an input X for L>=1 and a value $Y_j$ received on an input Y for L>1;

each internal $PC_{M,L}$ is configured to:

compute a value $A=X_j-Y_1*Y_j$ and output the value A to the input Y of the $PC_{M+1,L}$ for M<N and sets j>1; and select a value $B=Y_j$ and output the value B to the input X of the $PC_{M,L+1}$, for L<=N and sets j>=1;

each boundary $PC_{M,L}$ is configured to:

compute a value $C=(X_j-Y_1*Y_j)/((X_1-Y_1^2)^{1/2})$ and output the value C to the input Y of the $PC_{M+1,L+1}$ for L<N and sets j>1;

select a value $D=Y_j$ and output the value D to the input Y of the $PC_{M,L+1}$, for L<N and sets j>=1;

compute a result $Rb1=(X_1-Y_1^2)/((X_1-Y_1^2)^{1/2})$ and output the result Rb1; and select a value $Rb2=Y_1$ and output the value Rb2; and the corner $PC_{1,1}$ is configured to:

compute a value $D=X_j/(X_1^{1/2})$ and output the value D to the input Y of the $PC_{1,2}$ for sets j>1; and compute a value $Rc=X_1/(X_1^{1/2})$ and output the value Rc.

17. The systolic array of claim 14, wherein each internal $PC_{M,L}$ is further configured to output a value Ri, wherein $Ri=Y_1$.

18. The systolic array of claim 14, wherein:

the value Ri of internal $PC_{M,L}$ corresponds to the element at row M and column L of a factored output matrix;

the value Rb1 of boundary $PC_{M,L}$ corresponds to an element at row M+1 and column L of the factored output matrix;

the value Rb2 of $PC_{M,L}$ corresponds to an element at row M and column L of the factored output matrix; and the value Rc of corner $PC_{1,1}$ corresponds to an element at row 1 and column 1 of the factored output matrix.

19. The systolic array of claim 14, wherein each boundary cell $PC_{M,L}$ is further configured to output a value $Ri_j$ for each set of values j<(N−L), where the value $Ri_j=Y_j$.

20. An article of manufacture, comprising:

a data storage medium configured with non-transitory configuration data that when loaded onto a programmable integrated circuit cause a set of programmable elements to operate as a systolic array for Cholesky decomposition of an N×N matrix, the systolic array having a plurality of processing cells, including a corner cell, N−1 boundary cells, and $(N^2-3N+2)/2$ internal cells;

wherein the processing cells are arranged into N−1 rows and N columns of processing cells, row 1 beginning with the corner cell at column 1 and continuing with a boundary cell followed by N−2 internal cells, and each row M, M≠1, beginning with a boundary cell at column M+1 and continuing with N−M−1 internal cells, wherein 2≦M≦N;

wherein each processing cell located in row M and column L ($PC_{M,L}$) is configured to receive and process N sets of values, each set j of the N sets including a value $X_j$ received on an input X for L>=1 and a value $Y_j$ received on an input Y for L>1;

wherein each internal $PC_{M,L}$ is configured to:
  compute a value $A=X_j-Y_1*Y_j$ and output the value A to the input Y of the $PC_{M+1,L}$ for M<N and sets j>1; and
  select a value $B=Y_j$ and output the value B to the input X of the $PC_{M,L+1}$, for L<=N and sets j>=1;

wherein each boundary $PC_{M,L}$ is configured to:
  compute a value $C=(X_j-Y_1*Y_j)/((X_1-Y_1^2)^{1/2})$ and output the value C to the input Y of the $PC_{M+1,L+1}$ for L<N and sets j>1;
  select a value $D=Y_j$ and output the value D to the input Y of the $PC_{M,L+1}$, for L<N and sets j>=1;
  compute a value $Rb1=(X_1-Y_1^2)/((X_1-Y_1^2)^{1/2})$ and output the value Rb1; and
  select a value $Rb2=Y_1$ and output the value Rb2; and wherein the corner $PC_{1,1}$ is configured to:
  compute a value $D=X_j/(X_1^{1/2})$ and output the value D to the input Y of the $PC_{1,2}$ for sets j>1; and
  compute a value $Rc=X_1/(X_1^{1/2})$ and output the value Rc.

* * * * *